United States Patent [19]

Lowrey et al.

[11] 4,387,437

[45] Jun. 7, 1983

[54] RUNNERS WATCH

[75] Inventors: John W. Lowrey, 511 N. Hope St., Mansfield, La. 71052; Tom M. Hyltin, Dallas; J. Scott Jamieson, Arlington, both of Tex.

[73] Assignee: John W. Lowrey, Mansfield, La.

[21] Appl. No.: 242,889

[22] Filed: Mar. 12, 1981

Related U.S. Application Data

[63] Continuation-in-part of Ser. No. 60,594, Jul. 25, 1979, abandoned.

[51] Int. Cl.³ ............................................ G01C 22/00
[52] U.S. Cl. ................................... 364/561; 364/565; 364/410; 235/105; 368/113; 368/244
[58] Field of Search ............... 364/561, 565, 569, 705, 364/410; 307/247 A; 324/78 D, 166, 168, 171; 128/690; 235/92 MT, 92 DN, 105

[56] References Cited

U.S. PATENT DOCUMENTS

| | | | |
|---|---|---|---|
| 3,635,399 | 1/1972 | Dahlquist et al. | 235/105 |
| 3,818,194 | 6/1974 | Biro | 235/105 |
| 3,860,833 | 1/1975 | Tyau | 307/247 A |
| 4,019,030 | 4/1977 | Tamiz | 235/105 |
| 4,022,014 | 5/1977 | Lowdenslager | 364/569 |
| 4,053,755 | 10/1977 | Sherrill | 364/561 |
| 4,071,892 | 1/1978 | Genzling | 364/565 |
| 4,134,026 | 1/1979 | Sone et al. | 307/247 A |
| 4,202,350 | 5/1980 | Walton | 128/690 |
| 4,220,996 | 9/1980 | Searcy | 364/561 |
| 4,224,948 | 9/1980 | Cramer et al. | 128/690 |
| 4,285,041 | 8/1981 | Smith | 364/569 |

OTHER PUBLICATIONS

Omron Jogging Meter Specification Sheet, Omron Electronics, Inc., Schaumburg, Illinois.

*Primary Examiner*—Gary Chin
*Attorney, Agent, or Firm*—Jerry W. Mills

[57] ABSTRACT

A runners watch which includes a lightweight case dimensioned to be worn on the wrist of the wearer. A display face is formed on the case. Clock circuitry is disposed within the case for operating the display face in order to display the time of the day, the date and elapsed time to the wearer. A sensor in the case detects the stride of the wearer when the wearer is running or jogging. Circuitry within the case is responsive to the sensor for computing the distance traveled by the wearer. Circuitry within the case is also responsive to the sensor for computing the rate of travel by the wearer. Switches are provided on the case for being operated to display the computed distance and the computed rate of travel.

16 Claims, 15 Drawing Figures

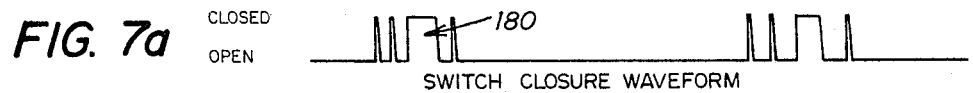
FIG. 7a — SWITCH CLOSURE WAVEFORM
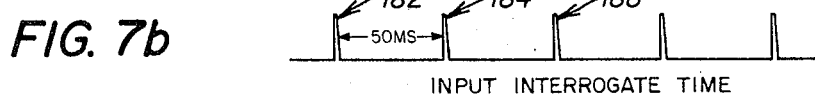
FIG. 7b — INPUT INTERROGATE TIME
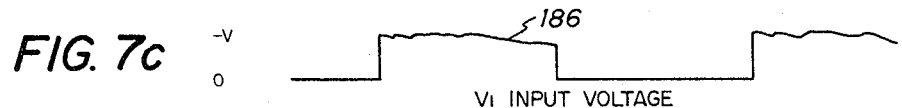
FIG. 7c — V₁ INPUT VOLTAGE
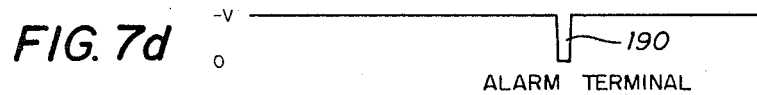
FIG. 7d — ALARM TERMINAL
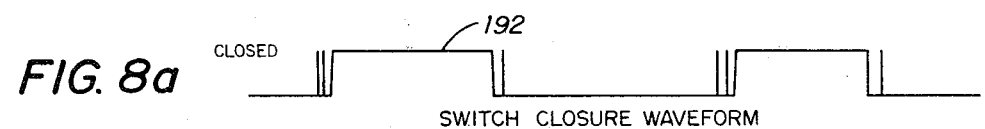
FIG. 8a — SWITCH CLOSURE WAVEFORM
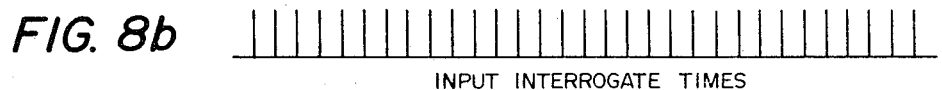
FIG. 8b — INPUT INTERROGATE TIMES
FIG. 8c — V₁ INPUT VOLTAGE
FIG. 8d — ALARM TERMINAL
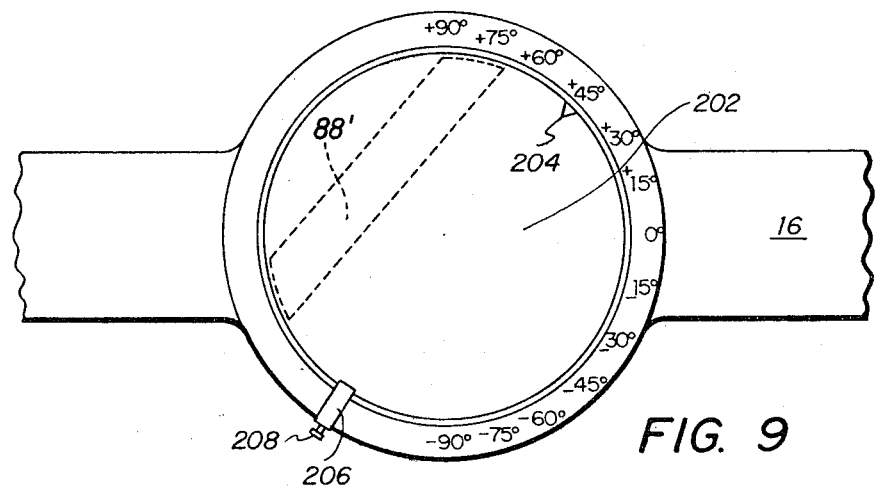
FIG. 9

RUNNERS WATCH

CROSS REFERENCE TO OTHER APPLICATIONS

This application is a continuation-in-part of Ser. No. 06/60,594, filed July 25, 1979, now abandoned.

FIELD OF THE INVENTION

This invention relates to timepieces and distance measuring devices, and more particularly relates to a runners watch for displaying the time of the day, the distance traveled by the runner and the rate of travel of the runner.

THE PRIOR ART

Pedometers of various types have long been used to measure the distance traveled by a person walking or running. Generally, such pedometers have been attached to the ankle, leg or waist of the wearer and have utilized a pendulum or the like in order to sense the motion of the wearer's leg. The pedometers have been calibrated according to the length of the stride taken by the wearer in order to mechanically display the distance walked or jogged. Examples of such previously developed pedometers are shown and described in U.S. Pat. Nos. 694,652, 962,679 and 3,818,194. Such previously developed pedometers have generally been located on a portion of the body making it difficult or impossible to read the distance traveled without removing the device or without stopping and bending over to read the output of the pedometer. Moreover, many previously developed pedometers calibrated according to the wearer's stride have tended to incorporate substantial inaccuracies in the distance traveled. Such pedometers are solely dependent on their accuracy by the accuracy to which the stride length can be measured and stored in the pedometer. Any inaccuracy in the stride length entered into the pedometer results in greater and greater errors as the distance increases. Moreover, many prior pedometers have suffered from inaccuracies due to bouncing of the sensor pendulum, thereby causing multiple readings indicating multiple strides when in fact only a single stride has occurred.

With the advent of jogging and running by the general populus, a need has arisen for a device for measuring the distance traveled with substantial accuracy. Moreover, a need has arisen for a device which may be normally worn during the day and which will also provide the time and date to the wearer. Moreover, many runners desire to know the rate of travel so that they will be able to run a distance in a prescribed time interval. Many runners base their running rate calculations on a mile distance and thus a need has arisen for a device which will continuously provide the runner with an accurate indication of the rate at which he is running based upon a mile distance.

At least on attempt has been made to provide a device for measuring distance traveled which may be viewed while running. For example, the Model JT5-JM8 Omron jogging meter manufactured and sold by Omron Electronics, Inc. of 650 Woodfield, Shaumburg, Ill., displays the distance traveled while positioned on the wrist of the wearer and also displays an elapsed time interval. However, the device is relatively large and bulky and is therefore able to be worn only during running. The weight of the Omron jogging meter is greater than optimum and could affect the running of certain wearers. This device does not provide an indication of the time of day or date. In addition, this device provides no indication of rate of travel and its distance measuring capabilities are dependent upon the accuracy which the stride length of the wearer is input therein.

SUMMARY OF THE PRESENT INVENTION

In accordance with the present invention, a runners watch includes a case dimensioned to be worn on the wrist of the wearer. A display face is provided on the case and a clock within the case operates the display face to display the time of the day and the date to the wearer. A sensor in the case is provided to detect the strides of the wearer while the wearer is running. Circuitry within the case is responsive to the sensor for computing the distance traveled by the wearer. Circuitry within the case is also provided to compute the rate of travel of the wearer in response to the sensor. A switch is provided on the case which when operated displays the computed distance and the rate of travel.

In accordance with another aspect of the invention, a runners watch is provided which includes a case dimensioned to be worn on the wrist of the wearer. A display face on the case is provided. A sensor in the case detects the occurrence of strides of the wearer while the wearer is running. Circuitry within the case is responsive to the sensor for computing the distance traveled by the wearer and also for computing the rate of travel by the wearer. A switch is provided to display the computed distance and the computed rate of travel on the display face. A sensor includes a pivotable pendulum movable between open and closed positions, the pendulum normally being biased to its open position and movable to its closed position by the acceleration occurring when the wearer's foot hits the ground during a stride.

In accordance with another aspect of the invention, a runners watch includes a case dimensioned to be worn on the arm of the wearer. A display is provided on the case. A detector senses the occurrence of strides of the wearer. Circuitry stores a predetermined number of strides taken by the wearer over a prescribed distance. Means is responsive to the detector for counting the number of strides taken by the wearer. Circuitry is responsive to the store circuitry and counting circuitry for generating an indication when the wearer has taken the predetermined number of strides. Circuitry is responsive to the indication for incrementing on the display the displayed distance traveled by the wearer. A debounce circuit is provided in order to provide a true indication of each one stride to eliminate erroneous indications.

DESCRIPTION OF THE DRAWINGS

For a more complete understanding of the present invention and for other obvious advantages thereof, reference is now made to the following description, taken in conjunction with the accompanying drawings in which:

FIG. 2 is a state diagram of various operations of the present runners watch;

FIGS. 7a-7d comprise waveforms illustrating the operation of the sensor and the debounce circuitries;

FIGS. 8a-8d comprise Figures indicating another operation of the sensor and debounce circuitry of the invention; and FIG. 9 is a view of an alternate embodiment of the present runners watch allowing adjustment of the sensor position.

DESCRIPTION OF THE PREFERRED EMBODIMENT

Figure 1:
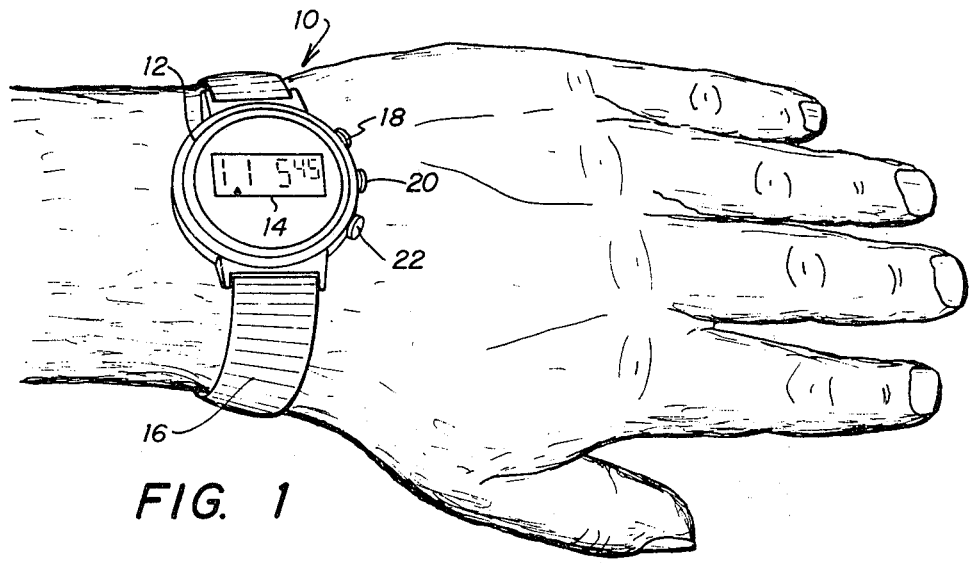
FIG. 1 is a perspective view of the preferred embodiment of the present runners watch.

Referring to FIG. 1, a runners watch 10 is illustrated in accordance with the present invention. The runners watch 10 includes an outer casing 12 with a digital display face 14 formed thereon in the manner of a conventional electronic watch. The runners watch 10 is attached to a conventional band 16 and is worn on the wrist of the wearer in the same manner as a conventional timepiece.

Three push button switches 18, 20 and 22 are mounted on the side of the runners watch 10 and may be depressed as will be subsequently described in order to set the time of the watch, to set a prescribed stride length into the watch and to cause the display of desired parameters to the wearer.

Runners watch 10 may be operated as a conventional timepiece in order to display the time of day and the date. The display face 14 may comprise any conventional watch display, such as light emitting diodes which may be intermittently displayed, or liquid crystals which provide a continuous digital display. Depression of the button 18 on the runners watch causes the display to display month and day in the manner of conventional watches.

By proper operation of the switch 22, the runners watch 10 may also display an elapsed time in minutes and seconds. In addition, the runners watch may display the number of miles run by the wearer, as well as the rate of running in minutes and seconds per mile. The use of the runners watch is then invaluable to the runner of jogger in providing an accurate indication of the distance run, the rate at which the run is being conducted and the elapsed time of the run. When the runners watch is not used in a running mode, it may be returned to a conventional timepiece mode to provide the time of day and date.

FIG. 2 illustrates a state diagram of the various states of operation of the runners watch 10, along with the operation of the switches 18-22 to effect such operation. Normally, the watch operates to display the time in hours, minutes and seconds as indicated by state 26. The button 18 is designated as the Display or "D" button. The button 20 is designated as the Set or "S" button and the button 22 is designated as the Mode or "M" button.

To display the state, the "D" button 18 is depressed. In order to set the time display, the "S" button 20 is momentarily depressed and the "D" button 18 is depressed until the desired numbers are displayed as shown in the display diagram 30. In this diagram, the hours are set at 10 and a static colon appears. The letter "A" is displayed in place of the minutes. To set the minutes, the "S" button 20 is depressed and the "D" button 18 is depressed at 32 until the desired minutes and zero seconds are displayed. In the display diagram 34, the colon is again static and 22 minutes are displayed. To set the month, the "S" button is depressed and the "D" button 18 is depressed until the desired month is set at 36. In the display diagram 38, the first month is illustrated at being set. The depression of the "D" button 18 causes the numbers to be reset at a two Hz rate.

To set the day of the month, the "S" button 20 is depressed at state 40 and the "D" button 18 is depressed until the desired date appears. As shown in display diagram 42, the day of the month 23 is illustrated.

After depression of the "S" button, a decision is made at step 44 as to whether or not the hold mode has been set. If not, the hours, minutes and seconds are displayed upon depression of the "D" button. If the hold mode has been set, the hours, minutes and seconds input are held at step 46 until the "D" button is depressed. The display diagram 48 illustrates the setting of 10 hours, 22 minutes and 0 seconds as input by the prior steps. In the normal timekeeping mode, alternate depression of the "D" button changes the display from hours: minutes: seconds to the month and date.

When it is desired to operate the runners watch in the timer mode, "M" button 22 is depressed. The timer begins at the fully zero condition and thereafter displays minutes, seconds and one-hundredths of a second. The timer may be started and stopped by depression of the "D" button as many times as desired. The timer is set at step 50 and displays all zeros as indicated by the display diagram 52. Depression of the "D" button begins the timer and pedometer at step 54. The colon in the display remains static at the beginning and ending of the timing, but blinks during the timing. The colon then blinks during the timing as indicated by the timing display 56. In addition, an annunciator dot is displayed to indicate the timer mode. In order to stop the timer, "D" button is depressed as shown at step 58. When stopped, the display diagram 60 indicates that 2 minutes, 53 seconds and 36 hundredths of a second have elapsed since the initial depression of the "D" button.

When the "D" button is momentarily depressed to again begin the timer at step 54, the accumulated time will remain on the timer and the timer will not be set at zero. Thus, when the "D" button is again depressed at step 58, the total time will be accumulated and the original time will not be lost. However, after step 58, if the "D" button is depressed and held for two seconds, the timer will reset to all zeros as indicated in the display diagram 52. The timer mechanism is connected to the pedometer portion of the circuitry, to be subsequently described, such that the pedometer and timer are started and stopped at the same time.

Because of this operation, if the user is running and using the watch and desires to stop for rest, the timer and pedometer may be stopped and the user may then rest. After resting, the runner can again begin to run and initiate the pedometer and the timer in order to begin to provide the runner with an accumulated running time, in addition to the accumulated distance and rate of running. During the timer and pedometer mode, a flag 62 as shown in display diagram 64 is present to indicate the timer and pedometer mode.

To convert the display from a timing mode to a pedometer mode, the "M" button 22 is depressed. An annunciator dot is displayed to indicate the pedometer mode. The timer and pedometer are initially set to zero at step 66 and provide an all zero display as shown in the display diagram 68. Display diagram 68 indicates that the display at this stage is a mixed display. The left-hand two digits comprise miles and tenths of miles and the display includes a decimal 70 for the mile display. This left-hand display represents the number of miles run. The right-hand portion of the display comprises four digits which are minutes and seconds per mile. This display represents a rate of travel in minutes and seconds to enable the user to determine his rate of running. Of course, it will be understood that the display could be in kilometers rather than miles, if desired.

The timer and the pedometer are started at state 72 by depression of the "D" button. The timer and pedometer are stopped by subsequent depression of the "D" button at 74. Further depression of the button returns the timer and pedometer back to the state 72 and provides a cumulative timing and pedometer mode as previously described. When it is desired to set the timer and pedometer to zero, the "D" button is held for a period of two seconds and the timer and pedometer are returned to the zero state at 66. The display diagram 76 indicates the display at the beginning of the timing and pedometer modes, while the display diagram 78 illustrates a display of a distance of 8.1 miles and a current running rate of 10 minutes and 45 seconds for one mile.

As will be subsequently described, the distance and rate displayed are determined by the operation of a pedometer unit which detects the number of steps and strides taken by the user during running or jogging. The number of strides for a measured distance of 0.1 mile is input into the circuitry in order to provide the distance and rate displays. In order to set the number of strides per 0.1 mile, the "S" button is depressed and the "D" button is depressed at step 80 until the desired number of strides per 0.1 mile has been set into the circuitry. During the setting, the number of strides per 0.1 mile is indicated at 211 strides at display diagram 82.

In order to reset the number of strides to zero in order to provide the number of strides input into the system, the "D" button is held and the "S" button is actuated to perform an upcount reset at 84. If the "S" button is released and pushed again, a downcount reset occurs. It will be understood that the strides per 0.1 mile will commonly be periodically reset in case of changes in the jogger's stride.

The utilization of the number of strides per 0.1 mile as a basic parameter in the operation of the system in an important aspect of the invention. The use of this parameter enables the system to be extremely accurate, as opposed to the utilization of a parameter such as the distance of a single stride which is subject to substantial degree of inaccuracy over a large number of strides. The system is set to accommodate up to 500 strides per 0.1 mile.

The use of the blinking colon in the conventional timing and date mode indicates to the runner the fact that he is in the conventional timing mode. When the colon is not blinking, separate annunciators provide indications of the timer or pedometer modes.

Figure 3:
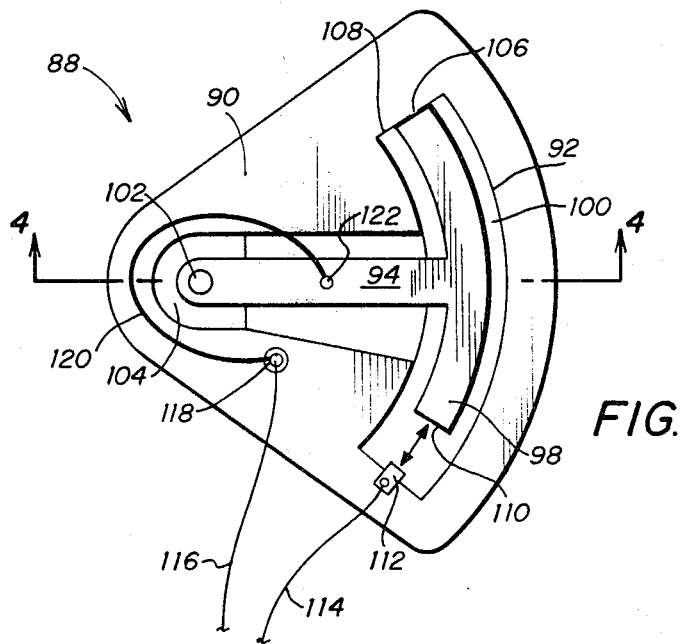
FIG. 3 is a top view of the present motion detector.
Figure 4:
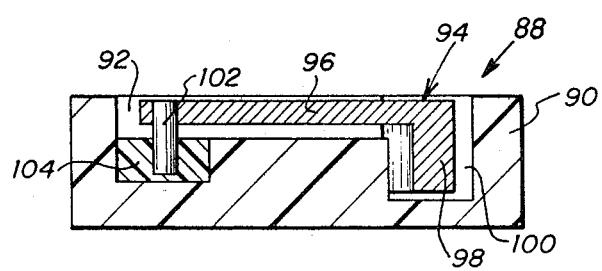
FIG. 4 is a sectional view taken generally along the section lines 4—4 of FIG. 3.

FIGS. 3 and 4 indicate the construction and operation of the detector 88 of the invention. The detector includes a lightweight housing 90 which may be formed from plastic or the like includes a cutout portion 92 for receiving a pendulum 94. Pendulum 94 may be formed from a relatively heavy metal such as brass or the like. Pendulum 94 includes a central arm 96 which extends along a line generally parallel to the forearm of the wearer. A curved base portion 98 is integrally attached to the arm 96 and extends downwardly into a cavity 100 as shown in FIG. 4. The end of the arm 96 is pivotally mounted on a pivot pin 102 which is fixed in a receiving block 104. The pivot pin 102 allows free pivoting movement of the arm 96. The curved base 98 includes a first end 106 which normally abuts against a surface 108 in the cavity 100. The second end 110 of base 98 is movable by inertia against an electrical contact 112. Electrical conductor 114 connects the contact 112 to the detecting circuitry to be subsequently described. An electrical conductor 116 extends to a contact 118 which is connected to a metal spring 120. Metal spring 120 is curved and is connected at one end to a contact 122 which is connected on the pendulum 94.

Referring to FIG. 3, it may be seen that during normal operation, the pendulum 94 is held by the force of the spring 120 in the illustrated upward position such that the first end 106 of the pendulum 94 is held against the surface 108. This position of the pendulum 94, as illustrated in FIG. 3, is maintained during normal walking and other movements of the user. However, in this condition, an open circuit exists between the conductors 114 and 116 due to the fact that second end 110 of the pendulum 94 is not in connection with contact 112. The detector 88 is thus biased such that strides of the wearer due to normal walking are not detected. However, when the user begins to run or jog, the pendulum 94 moves downwardly with sufficient additional acceleration that the second end 110 connects with the contact 112.

By proper design of the spring 120, the pendulum 94 moves downwardly to contact the contact 112 each time the user's foot hits the ground. When the user's foot hits the ground, a substantial amount of acceleration of the user's body occurs. Due to the dense nature of the pendulum 94, the pendulum 94 tends to maintain its inertia, and thus a closing between the second end 110 and the contact 112 occurs. When this contact occurs, a closed circuit exists between the electrical conductors 114 and 116. This closing of the electrical circuit is sensed by the detecting circuit to be subsequently described in order to indicate that one stride of the user has occurred in a running mode. The pendulum 94 is normally maintained by the user in a generally vertical direction such that the pendulum 94 may move about the pivot pin 102 in order to detect the strides of the user.

The present circuit has stored therein the number of strides of the wearer over a prescribed distance. Thus, upon each detection of a stride, the circuitry operates upon the stored stride parameters in order to provide a cumulative indication of the distance run by the user, as well as the rate of running of the user.

Figure 5:
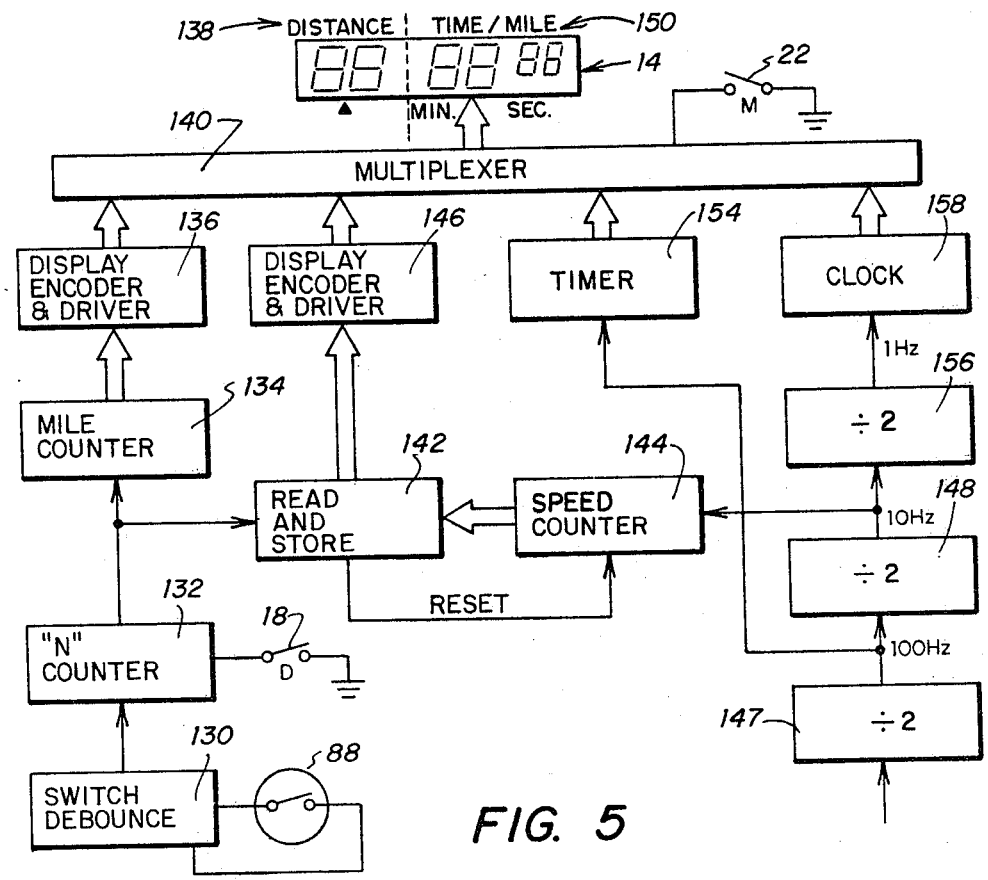
FIG. 5 is a block diagram of the electrical portion of the invention.

FIG. 5 illustrates a block electrical diagram of the circuitry of the present invention. The pendulum 88 described in FIG. 3 is connected across a switch debounce circuit 130. As will be subsequently described, the switch debounce circuit 130 detects only a single switch closure per stride and eliminates false closures of the pendulum detector 88. The output from the switch debounce circuit 130 is applied to "N" counter 132. Counter 132 is a programmable counter and counts the number of strides per 0.1 mile. The button 18 connects to the "N" counter 132 in order to input the stored count "N."

Assuming that the counter 132 is initially set to zero, each time the user takes a step which is sensed by the detector 88, the counter 132 will increment by one unit. The counter 132 will continue incrementing until the count is equal to "N." The count "N" is equal to the number of strides taken by the user over 0.1 mile. "N" is input into the counter 132 by operation of the "D" button 18 as previously described in step 80 in FIG. 2. The "N" counter 132 may comprise any suitable programmable counter commercially available. As an example, the counter 132 may comprise a storage for the parameter "N," a counter for the sensor output, a comparison circuit for detecting when the contents of the two circuits are equal and a reset circuit.

When the counter 132 has counted "N" strides and an output pulse is generated to a mile counter 134, the "N" counter 132 resets to zero. Mile counter 134 detects the output from the counter 132 and accumulates the indicated distances of 0.1 mile to provide a cumulative mile indication. The output of the mile counter 134 is applied to the display encoder and driver 136 and the cumulative distance in miles and tenths of miles is displayed in the display portion 138 of the display 14. The output of the display encoder and driver 136 is applied through a multiplexer 140, the state of which is controlled by operation of the "M" button 22 on the watch body as previously described.

In operation of the circuitry, the detector 88 generates one pulse for each stride taken by the user. Detector 88 is connected to "N" counter 132 via a debounce circuit 130 as shown in FIG. 5. Debounce circuit 130, which is described below in greater detail, prevents "N" counter 132 from interrogating detector 88 no more often than once every 50 milliseconds. When the number of strides is detected by the counter 132 as comprising the normal number of strides taken by the user in 0.1 mile, the counter 132 increments the mile counter 134 by 0.1 mile, the cumulative distance is displayed on the display 14 and counter 132 is reset. The display encoder and driver 136 receives a binary output from the mile counter 134 and converts the binary signal to a seven segment code with modulation for a liquid crystal display, or a seven segment code for an LED-type display.

The output from "N" counter 132 is also applied to a read and store circuit 142 and to a speed counter 144. Read and store circuit 142 is a latch which is activated by "N" counter 132 when the runner has traversed a 0.1 mile increment to store the cumulative count of speed counter 144. The speed counter 144 provides a timing input, indicative of the runner's speed, to read and store circuit 142. A 10 Hz signal is applied to the speed counter 144, which counts 10 pulses per second. If the runner is traveling, for example, at a rate of 9 minutes per mile, he will traverse 0.1 miles in 0.9 minutes or 54 seconds and the counter will count 540 pulses before being reset. This count will be stored by read and store circuit 142 upon indication by "N" counter 132 that the 0.1 mile increment has been reached. The stored signal in circuit 142 is then applied to the display encoder and driver 146 as representing the runner's rate for an entire mile, even though the stored signal was accumulated over only 0.1 miles. The encoder 146 will convert the 540 seconds to a minute and second reading of 9 minutes 00 seconds.

The basic time frequency for the clock is applied to a divider 147 which generates a 100 Hz signal. The 100 Hz signal is applied through a divider 148 which generates a 10 Hz signal. The 10 Hz signal is applied to the speed counter 144 which counts elapsed time between each 0.1 mile at ten times the clock rate thereby multiplying the travel rate by ten to give the travel rate per mile. The count is continuously applied to the read and store circuit 142 for display as the time which has elapsed during 0.1 mile after being multiplied by ten. Each successive update of counter 132 is applied to counter 144 via a reset line as shown in FIG. 5 such that speed counter 144 begins counting from zero each time the runner traverses 0.1 miles. The number applied to the display encoder and driver 146 is thus ten times the actual time which has elapsed during the last 0.1 mile run by the user. This rate is updated each time the user runs another 0.1 mile, such that the display 150 is a periodically updated rate of running of an entire mile. In this way, the runner will be able to tell the rate at which he will run the entire mile and will be able to accommodate his run according to his desired time. The display 150 will normally display only a maximum rate of running such as 35 minutes for a mile.

The output from the divider 147 is also applied to a timer 154 which accumulates the time during a predetermined interval. The output of the timer 154 is applied through the multiplexer 140 to display an elapsed time under the control of the "M" button 22. The output of the divider 148 is applied to a divide-by-ten divider 156 which provides a 1 Hz signal to a clock 158. The output of clock 158 is applied through the multiplexer 140 under the control of the "M" button 22 to display the time in hours, minutes and seconds in the conventional manner. Dividers 147, 148, 156 comprise a conventional clock countdown chain to provide timing for the conventional clock circuitry. The countdown chain also provides timing for the month and date display.

It will be understood that the clock circuitry and the timer circuitry may be constructed in the conventional manner normally used for integrated circuitry watches. A variety of different types of circuits may be utilized to provide the functions and features previously described. It would, for example, be possible to implement the functions of the present invention in a microprocessor chip which is utilized to control the display. Such chips are now conventionally used in miniaturized wrist watches. It will also be understood that the distance and speed computations could be made at intervals other than 0.1 miles. For example, the "N" counter and mile counters could be used to count distances of 0.01 miles with the speed counter running at 100 Hz to provide the travel rate over 1 mile. In such case the runner would enter the number of strides taken in 0.01 miles.

Figure 6:
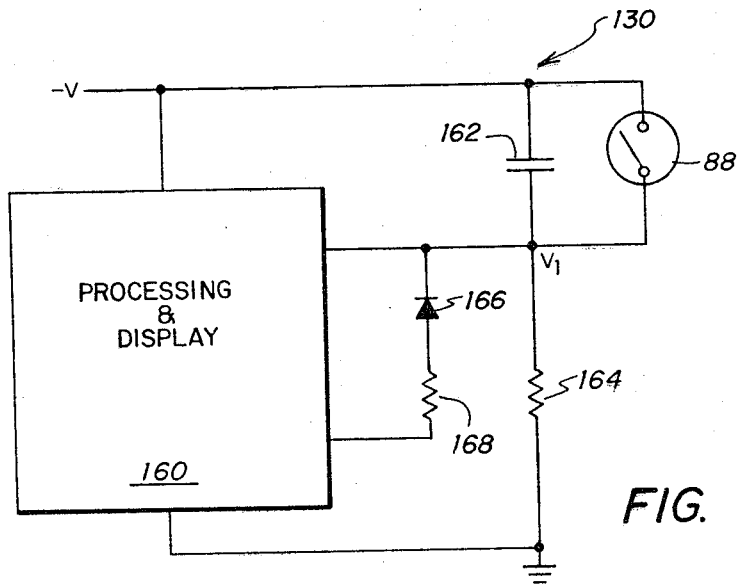
FIG. 6 is an electrical schematic of the debounce circuitry of the invention.

An important aspect of the present invention is the switch debounce circuit 130. This circuit is shown in FIG. 6 and provides the function of detecting a single switch closure and to eliminate erroneous or plural switch closures. The processing and display circuitry shown in FIG. 5 is illustrated in the block 160 and the debounce circuit 130 is illustrated as comprising a capacitor 162 which is connected across the detector 88. One terminal of capacitor 162 and detector 88 is connected to the bias voltage, which in the illustrated embodiment is a negative bias voltage. The remaining terminals of the capacitor and detector are connected together to one terminal of a resistance 164 which is tied to circuit ground. The common terminal of the capacitor 162 and the detector 88 is also tied to an input to the processing and display circuitry 160 which would comprise the input to the "N" counter 132. The cathode of a diode 166 is also attached to the input of the circuitry. The diode 166 is connected in series with a resistance 168 which is applied to receive an alarm signal from the processing and display circuitry 160.

The RC circuitry comprising the capacitor 162 and the resistance 164 yields a time constant of approximately 250 milliseconds. Assuming that the detector 88 has not been closed for a long time, the voltage across the capacitor is fully charged and there is essentially no current through the resistor 164. At this state, there is no voltage difference between ground and the V1 terminal as illustrated, and thus the voltage level at V1 is equal to zero. When the user begins to jog, the detector switch 88 is closed. At this point, the voltage across the capacitor 162 will be dumped and voltage V1 will go to −V. Because of the time constant of the RC network, 250 milliseconds lapse before the charge on the capacitor 162 builds up to 63% of its final voltage value. The "N" counter 132 is constructed to interrogate the detector 88 no more often than 50 millisecond intervals. Because of the RC circuitry, the voltage at $V_1$ will not change significantly from −V for at least 150 milliseconds after the first momentary switch contact. In this manner, additional switch contacts will not be detected to provide a switch debouncing function to the circuitry.

When the alarm input is applied to ground, a charging path is applied through resistor 168 in order to recharge the capacitor 162 very quickly. This enables the voltage at $V_1$ to be brought back down to ground within a few milliseconds when desired.

FIGS. 7a–7d illustrate waveforms of the debounce circuitry. FIG. 7a illustrates the open and closing of the detector 88. As seen by the four pulses generally identified by numeral 180, it may be seen that the detector is closing twice for relatively short intervals, a third time for relatively long intervals and a fourth time at a very short interval. FIG. 7b illustrates the input interrogate time which illustrates that the "N" counter 132 interrogates the detector at 50 millisecond intervals. FIG. 7c indicates the voltage at $V_1$ which comprises the input voltage to the "N" counter 132. Since the voltage shown in FIG. 7c is the voltage detected by the counter 132 during interrogation, it will be seen at the first interrogation pulse 182 that the counter will detect a zero $V_1$ voltage to indicate that the detector is open.

At the second interrogation pulse 184, the voltage at $V_1$ is at level 186 and is essentially at −V due to the first closing of the detector. At the third interrogation point at pulse 188, the voltage at $V_1$ is still at −V and the counter 132 then assumes that the switch has closed and that it is a valid input. The counter 132 must then detect a high voltage at two consecutive interrogation pulses in order to count a switch closure. FIG. 7d indicates the generation of an alarm pulse 190 and after the detection of a valid pulse, the alarm input is applied to ground to cause $V_1$ to go from −V to ground. The alarm pulse 190 need be 5 to 10 milliseconds in order to cause charging of the capacitor 162. If the detector 88 is still closed, the capacitor 162 cannot be charged by the alarm pulse 190. This confirms that a legitimate opening of the detector has not occurred.

FIGS. 8a–8d illustrate similar waveforms such as shown in FIGS. 7a–7d, but with much slower running rates and therefore a much longer switch closure. As shown in FIG. 8a, the switch 88 is closed at step 192 for a very long time. FIG. 8b indicates that the input interrogation pulses are compressed on a time scale for ease of illustration of the slower jogging rate. The $V_1$ input voltage thus stays high for a much longer time than that previously described and a number of interrogation pulses will indicate a high $V_1$. Thus, the reset pulses applied from the alarm terminal as shown in FIG. 8d do not operate to recharge the capacitor 166 until the detector has opened. In the illustrated waveform of FIG. 8e, nine reset pulses from the alarm terminal are required before the capacitor 166 can be recharged.

It will be understood that the various component values of the debounce circuit shown in FIG. 6 will vary in accordance with the desired operating parameters of the present system. Generally, the value of resistance 164 will be approximately ten times the value of resistance 168. For an infinite impedance (>50 megohms) of the "N" counter 132, the values of resistance 164 could be equal to 5 megahoms, the value of capacitor 162 could be 0.047 microferads and the value of resistance 168 could be 47 K ohms.

FIG. 9 illustrates an alternate embodiment of the present invention which enables the pendulum detector 88 to be varied in position for various runners. In this embodiment, detector 88 which may be variably positioned is diagrammatically illustrated in its variable position by the dotted line area 88. Detector 88 is affixed to a movable plate 202 at the rear of the watch. On the outer fixed parameter of the watch, various plus and minus degree indicia are provided. A pointer 204 is provided on the movable plate. The position of the detector may be adjusted relative to the wrist of the user by rotation of the plate 202 and the detector 88. When the pointer 204 is adjacent the desired angular indicia, a locking device 206 may be actuated in order to lock the movable plate 202 and detector 88 in position. A screw 208 may be adjusted to provide the locking action. In this way, the position of the detector 88' may be adjusted to accommodate various arm swings and positions of the runner's arms in order to provide a better stride detector.

It will thus be seen that the present invention provides a runners watch which can operate as a conventional timepiece while also providing accurate indications of the distance run and rate of running, as well as elapsed time. The present invention operates to detect the occurrence of a stride of the runner while the detector is positioned on the runner's wrist. This eliminates the use of cumbersome pedometers which have normally been required to be worn on the runner's ankle, belt or the like. The use of the present watch enables the runner to conveniently note the elapsed time, the distance run and the rate at which the race is being run.

The present watch is easily switched from one mode to another with the use of switch buttons conveniently located on the exterior of the watch casing. The present invention incorporates debounce circuitry which eliminates false readings of the detector in order to provide a very accurate indication of each stride taken by the wearer when running or jogging. The present device thus provides a very lightweight, compact and attractive watch which may be normally worn as a conventional watch, but which may be operated as a runners watch when desired.

Whereas the present invention has been described with respect to specific embodiments thereof, it will be understood that various changes and modifications will be suggested to one skilled in the art, and it is intended to encompass such changes and modifications as fall within the scope of the appended claims.

We claim:
1. A runners watch comprising:
   a case dimensioned to be worn on the wrist of the wearer;

a display face on said case;

clock means within said case for operating said display face for displaying time of the day to the wearer;

sensor means in said case for detecting the occurrence of strides of the wearer while the wearer is running;

input means for inputting and storing the number of strides required for the wearer to travel a prescribed distance, said prescribed distance being a fraction of a predetermined unit of distance;

circuitry within said case responsive to said sensor means for computing the rate of travel by the wearer after the stored number of strides has been taken;

circuitry within said case for transforming the rate of travel computed for the stored number of strides to the rate of travel over said unit of distance; and means on said case for displaying said computed rate of travel for said unit distance on said display face.

2. The runners watch of claim 1 and further comprising:

means in said casing for computing the distance run by the wearer.

3. The runners watch of claim 2 and further comprising means for updating said computed rate of travel after the wearer travels a prescribed distance.

4. The runners watch of claim 2 wherein said computed distance traveled and said computed rate of travel over said unit of distance may be simultaneously displayed on said display face.

5. The runners watch of claim 1 wherein said sensor means comprises:

a pendulum which moves from a first position to a second position in response to the occurrence of a stride by the user; and means for normally biasing said pendulum in said first position.

6. The runners watch of claim 5 and further comprising circuitry for detecting valid actuations of said pendulum.

7. The runners watch of claim 1 and further comprising:

means for displaying an elapsed time interval on said display face.

8. The runners watch of claim 2 wherein said computing circuitry comprises:

means for timing the length of time required by the wearer to take a number of strides equal to the number of strides input by said input means; and means for multiplying said length of time by a factor to provide the rate of travel over said unit distance.

9. The runners watch of claim 8 and further comprising means to update the computed rate of travel each increment of said prescribed distance traveled by the wearer.

10. The runners watch of claim 1 wherein said sensor includes means for biasing said sensor such that said sensor does not detect strides due to normal walking of the wearer.

11. The runners watch of claim 1 wherein said sensor means moves between open and closed positions while sensing strides and further including a debounce circuit comprising:

a capacitor connected across said detector for being charged with a voltage when said detector is open and being discharged when said detector is closed;

means for periodically interrogating the voltage level of said capacitor; and means for indicating the presence of a stride only when a predetermined number of consecutive interrogations indicate a predetermined voltage level across said capacitor.

12. The runners watch of claim 11 and further comprising:

means for recharging said capacitor with a voltage when said detector moves from a closed to an open position.

13. The runners watch of claim 5 wherein said pendulum is normally biased to its open position and movable to its closed position by the acceleration occurring when the wearer's foot hits the ground during a stride; and means for detecting said closed position of said pendulum.

14. The runners watch of claim 13 wherein said pendulum is normally biased by a spring to its open position.

15. The runners watch of claim 14 wherein said spring is conductive and wherein said means for detecting said closed position comprises:

a contact disposed adjacent said pendulum;

a first conductor connected to said spring;

a second conductor connected to said contact; and means for detecting a closed circuit between said first and second conductors.

16. A runners watch comprising:

a case dimensioned to be worn on the wrist of the wearer;

a wrist band connected to said case for supporting said case on the wrist of the wearer;

a display face on said case;

sensor means in said case for detecting the occurrence of strides of the wearer while the wearer is running;

input means for inputting the number of strides required for the wearer to travel one-tenth of a mile;

storage means for storing said number of strides;

circuitry within said case responsive to said sensor means for computing the distance traveled by the wearer;

circuitry within said case responsive to said sensor means for measuring the length of time required for the wearer to take a number of strides equal to the stored number of strides;

circuitry within said case for multiplying the length of time required by the wearer to take the stored number of strides by a factor of 10;

circuitry within said case for storing the multiplied length of time as computed rate of travel;

means on said case for being operated for displaying said computed distance traveled and said computed rate of travel on said display face.

* * * * *